March 8, 1949.    C. F. SHEPARD    2,464,001
CARD FOR TESTING THE COLOR SENSE OF THE HUMAN EYE
Filed Aug. 19, 1947    3 Sheets-Sheet 1

INVENTOR
Carl F. Shepard
BY
Ivan E. C. Konigsberg
ATTORNEY

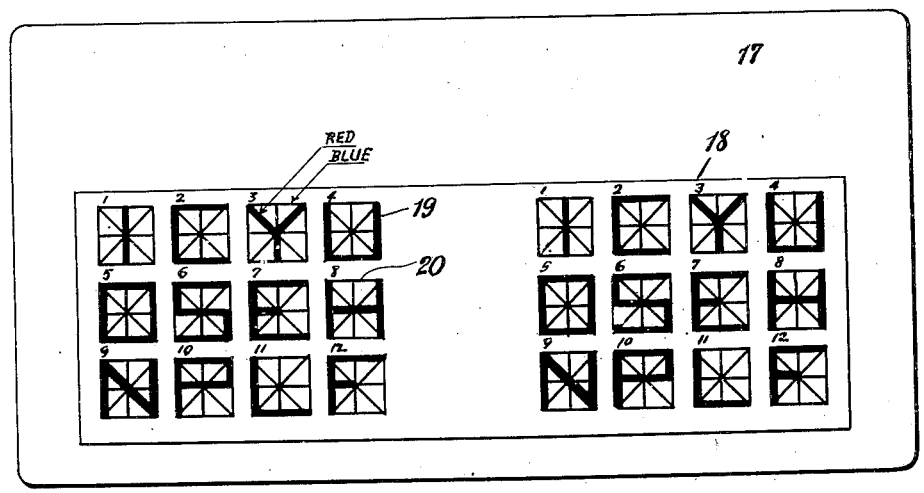
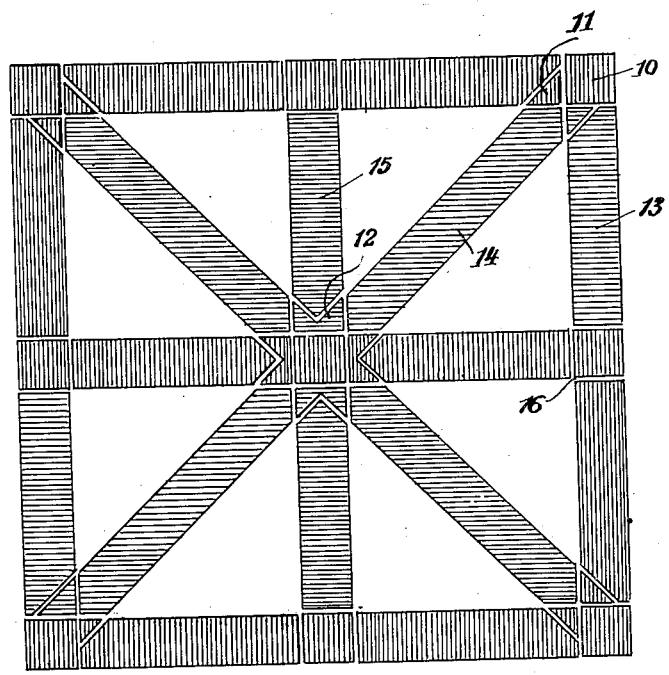

March 8, 1949. C. F. SHEPARD 2,464,001
CARD FOR TESTING THE COLOR SENSE OF THE HUMAN EYE
Filed Aug. 19, 1947 3 Sheets-Sheet 3
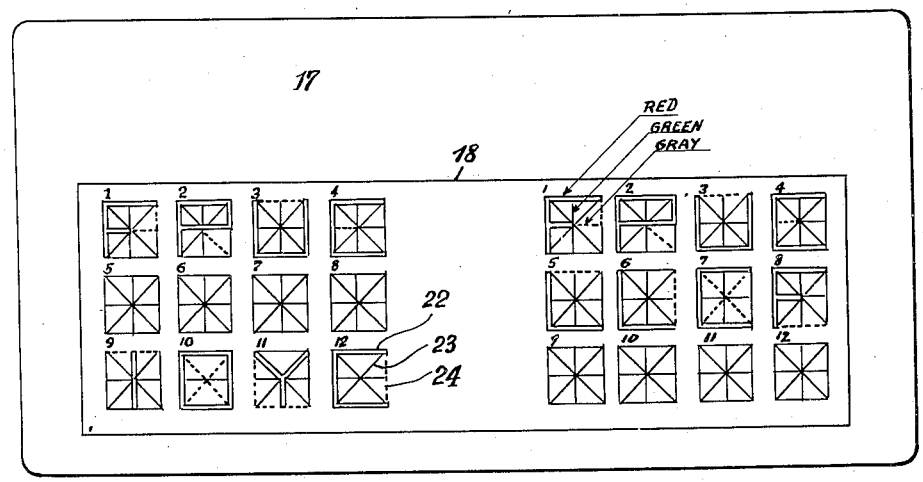
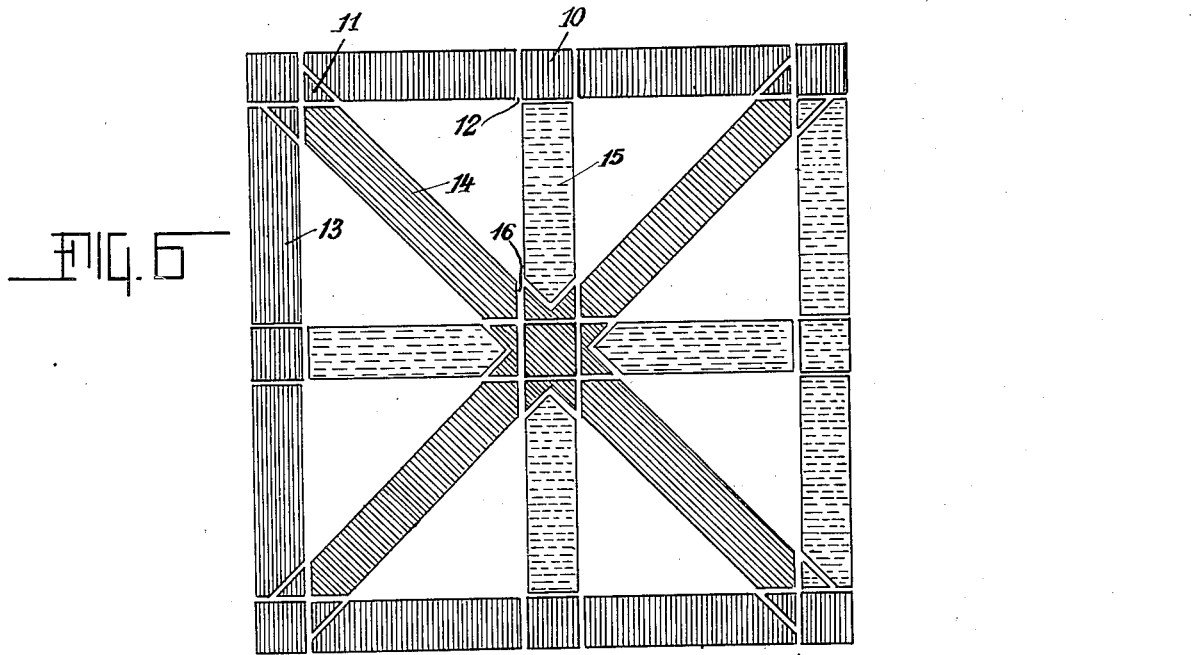
INVENTOR
Carl F. Shepard
BY
Ivan E. A. Konigsberg
ATTORNEY Patented Mar. 8, 1949

2,464,001

UNITED STATES PATENT OFFICE 2,464,001

CARD FOR TESTING THE COLOR SENSE OF THE HUMAN EYE

Carl F. Shepard, Chicago, Ill., assignor to Keystone View Company, Meadville, Pa., a corporation of Pennsylvania Application August 19, 1947, Serial No. 769,502

6 Claims. (Cl. 88—20)

This invention relates to improvements in charts or cards used for testing color vision. This application is a continuation in part of my pending application filed January 30, 1946, Serial Number 644,245. The object of the invention is to provide novel and improved cards to be used in constructing and conducting tests of visual ability to perceive differences in brightness of hues, surface characteristics, details of patterns and other elements which may be defined or distinguished by the application of color.

Any means for testing and measuring the ability to perceive differences between two or more objects require the presentation of a multiplicity of test items or objects. The principle or method of conducting color vision tests as herein disclosed requires that the test items or objects presented or used be identical in every perceptible respect except that of color. The purpose of the invention is to supply test charts or cards whereby to determine the ability to perceive differences between several test items by means of the ability to see and distinguish the colors thereof.

Heretofore certain test patterns, charts, targets or cards have been proposed for testing color vision. Such prior patterns provide a mosaic of round or irregular shaped spots or areas of differently shaped items of different colors so that not only the hue or color, but also the positions, shapes or sizes of elements are altered when different patterns are prepared for the purpose of testing color vision.

According to the present invention a basic design is provided within which other figures may be seen, provided the subject is able to perceive differences between selected elements of the basic design. The latter is so conspicuous and so frequently repeated it dominates the attention unless the subject is able to perceive the subtle, controlled, graduated differences between selected elements of the basic design.

The basic design selected as being particularly well adapted for the purposes of this invention is one form of the design known as "King Solomon's Seal" which has the advantage that it consists of definitely shaped elements which may form any desired letter of the alphabet, digits, many symbols and shapes. All the elements or items occupying the same relative position within the basic design are of the same shape and size, differing, if at all, only in color.

The basic design is printed on cards and may be used directly or in a stereoscopic instrument adapted for vision testing and training. The invention comprises an instruction card and a test card. The instruction card is used for explaining to the subject the nature of the answers expected from him in making a test. The nature of the differences in colors used on the card are such that they may be perceived by all but the most rare of those commonly called color blind. The instruction card serves to prepare the subject for the color tests in that it enable him to familiarize himself with the shapes, letters, digits and other symbols which he later on will be called to identify so that failure to pass the test will not be due to any misunderstanding of what is expected of him. And this without giving him any opportunity to find clues other than the differences in color that might help him in passing the test without being fully able to distinguish between the test colors.

The invention is embodied in a slide or card adapted to be inserted in a standard stereoscopic instrument for conducting the tests. Upon the card is printed, in duplicate arrangement, a plurality of the basic designs. Certain selected portions of the designs are colored so that tests of visual ability to differentiate between test items distinguished by color may be conducted. In the accompanying drawings illustrating the invention:

Fig. 3 is a view of the instruction card.

Fig. 4 is an enlarged view of one of the designs shown in Fig. 3.

Fig. 5 is a view of one of the test cards.

Fig. 6 is an enlarged view of one of the designs shown in Fig. 5.

Figure 1:
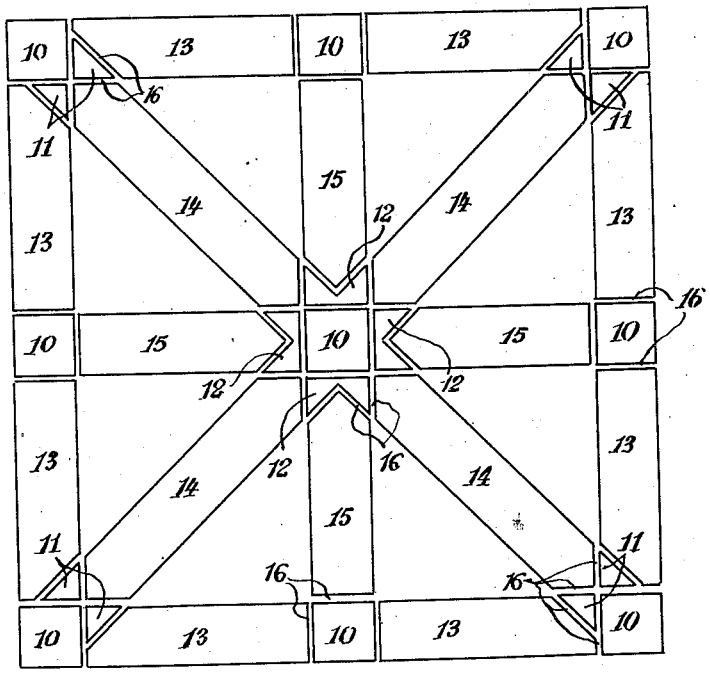
Fig. 1 is an enlarged view of the basic design.

Fig. 1 shows the basic design which is composed of six categories of elements. One category consists of nine square elements marked 10. A second category consists of eight triangular elements marked 11. A third category consists of elements in the form of united triangles or V-shape of which there are four marked 12. A third category of eight elements are in the form of parallelograms with one corner cut off. These are marked 13. A fifth category of elements consists of shapes resembling elongated hexagons. There are four of these marked 14. Finally there is a sixth category of elements shaped like pointed arrows marked 15. Adjacent elements are separated by spaces or white lines 16. These are preferably of equal widths but may be varied from one design to another and may be varied within a single design. Such variations are not illustrated. Because of the difficulty and labor involved in showing the white lines in the small designs in Figs. 3 and 5, these lines are omitted in these figures.

The cards are of a size and shape adapted to be inserted as slides in a standard stereoscopic instrument. The instruction card 17, Fig. 3, has pasted thereon a sheet of white paper 18 upon which the designs are printed in duplicate arrangement as shown for use in a stereoscope. Because of the smallness of the designs, which are shown in the patent drawing in actual sizes, the conventional color symbols are not used. Instead, the color red is represented by heavy lines 19 and the color blue is represented by thin lines 20. The colors red and blue are the only colors used in the instruction card.

A sample test card is shown in Fig. 5 and is similar to the card in Fig. 3. Also in Fig. 5 the conventional color symbols have been found too difficult to draw. Instead, the three colors used, namely, red, green and gray are represented by double lines 22, thin lines 23 and dotted lines 24, respectively and as indicated. The designs are numbered from one through twelve for convenience in conducting the tests. The arrangement of the twelve designs in a set, one set on each side for each eye, has been found best fitted for the purpose of the invention and for use within the field of the standard stereoscopic instrument.

A study of the basic design will show that the several letters of the alphabet, digits and several symbols as well as selected shapes can be found within the design by providing certain of the elements with surfaces perceptibly different in colors from other surfaces within the design. In the instruction card the letters are colored red in contrast with the background lines which are colored blue. Fig. 4 is an enlarged view of design number six in the instruction card Fig. 3 and shows the letter S in red. In observing the instruction card the subject should be able to call all the red letters in the square designs correctly as a preliminary step for the real color vision test. Almost all persons commonly deemed totally color blind will be able to call all the red letters in the introductory card.

Figure 2:
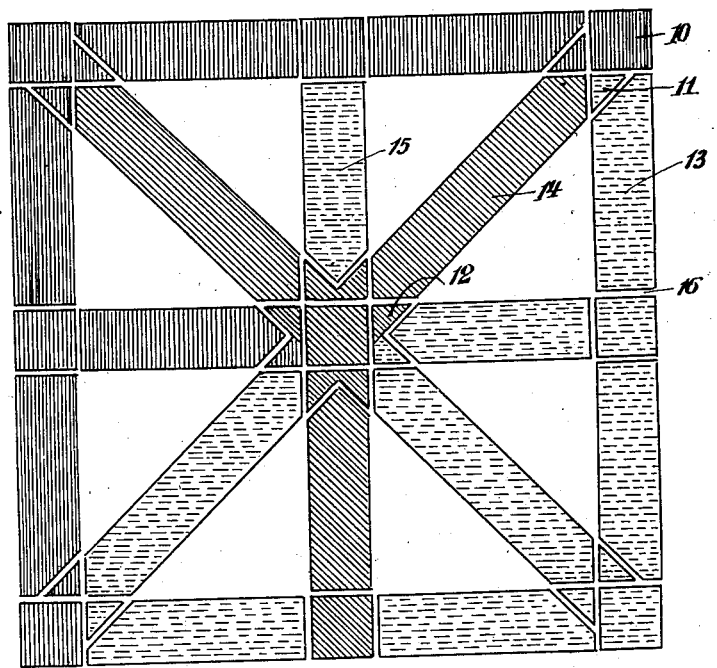
Fig. 2 is a similar view with parts colored to illustrate the principle of the invention.

The designs in the test cards are colored red, green and gray. Red and green are selected as best suited for color vision tests, while gray forms a good neutral background and completes the design. The coloring of a design to distinguish certain elements from the other elements therein is shown in Fig. 2 for comparison purposes with the basic design in Fig. 1. In Fig. 2 the red elements form the letter F, the green elements form the letter Y, the remaining elements are gray.

The test card Fig. 5 has the two sets of twelve designs but the sets are not alike and the arrangements of the two sets are different. The arrangements of the designs and the colored elements selected to form letters of the alphabet are arbitrary, but based upon experience in conducting color vision tests. The two top lines are identical. The gray line of designs is second on the left side, but third on the right side. The bottom line on the left side shows the letters I, O, Y, C, in red, whereas the second line on the right side shows the letters L, L, C, F, in red. Fig. 6 is an enlarged view of design number seven on the right side of Fig. 5 and shows the letter C in red and the letter X in green. This view also illustrates the white spaces between adjacent elements in the design.

If the attention of a subject is called to design number one in the test card Fig. 5, he will see and announce the letter F formed of elements colored red. If the subject belongs to the class commonly called color blind, he will announce the letter as being the letter P. The socalled green blind will in this design number one see the letter F. However, in the design number four the green blind will see the letter E, but the normal or red blind will see the letter C.

From the foregoing examples it will be clear that the invention provides means for color vision testing in which the basic design which has been selected is capable of almost infinite variations in forming letters, digits, symbols and shapes which experience has shown as best suited for the purpose.

The white space or lines 16 serve to circumscribe and separate one category of elements from another category so that the individual shapes may be defined and distinguished. The white lines may be varied in widths depending upon the difference in strengths or shades of the colors selected. For example, variations from a minimum selected width is not required when such differences are easily perceptible. But when the differences in strength of shade or tone are slight or delicate so that they may not be readily reproduced on the cards, the effect of finely shaded or graduated difference in strength or brightness of color may be achieved between adjacent elements by correspondingly grading the width of the white spaces or lines. A constant very slight difference in hues between adjacent elements is made more difficult of detection by widening the space between them.

The basic design in which the invention is embodied is of great advantage for color vision test purposes. It is a design which commands attention even when colored in a neutral shade. The great contrast of the design with the underlying surface of the sheet 18 increases the difficulty of perceiving differences between certain elements of the design and decreases the difficulty of creating just perceptible or not quite perceptible differences between the elements.

As pointed out above, the design is particularly suited as a medium for forming familiar letters, digits and symbols. This feature makes it possible to suggest certain letters or shapes by controlled intended differences without introducing unintended clues to the identities of the letters or symbols selected. Usually the tests are made by means of a standard stereoscopic instrument, but the cards may be used directly. Both or either eye may be tested. When testing one eye, the one side of the card is covered.

I claim:

1. A system for testing the color sense of the human eye comprising the preliminary viewing of colored instruction cards and a subsequent viewing of differently colored test cards, the combination of an instruction card and a test card, both of said cards having a single surface provided with two groups of identically arranged dominant basic designs, each design being formed of the same number of spaced portions of the same shape and size within each design, the two groups on the instruction card having portions colored with one color to form distinguishable symbols and having their remaining portions colored with a contrasting color to form other distinguishable symbols; the two groups on the test card having certain portions colored with one color to form distinguishable symbols and having other portions colored with a complementary color also forming ditinguishable symbols, the remaining third portions being colored with a third different color, the colors on the said instruction card being different from the colors on the said test card.

2. An instruction card and a test card according to claim 1 in which the colors on the instruction card are red and blue, and the colors on the test card are red, green and gray in the order named.

3. Cards according to claim 1 in which the said dominant basic design is a form of the design known as King Solomon's seal comprising a number of geometrically shaped portions constituting the design, said portions being separated by white spaces.

4. A card for testing the color sense of the human eye comprising a card having a single surface provided exclusively with a plurality of spaced designs, each of said designs consisting of the same number of spaced portions arranged in the same order to form an over all dominant basic design, all of said designs being placed on said card in the same relative spaced formation, certain portions of some of said designs being colored red to form distinguishable symbols, certain other portions adjacent to said red colored portions being colored green to form other distinguishable symbols, all of said colored designs having their remaining portions colored gray, certain of said dominant basic designs being colored exclusively gray.

5. A test card according to claim 4 including two separate groups of dominant basic designs arranged and colored as aforesaid.

6. A test card according to claim 4 in which the colored designs in one group of designs occupy a position within the group different from the positions occupied by the colored designs in the other group.

CARL F. SHEPARD.

REFERENCES CITED

The following references are of record in the file of this patent:

UNITED STATES PATENTS

| Number | Name | Date |
|---|---|---|
| 2,213,467 | Greenspoon | Sept. 3, 1940 |

OTHER REFERENCES

Bausch & Lomb Magazine, vol. XX, #2 (1944), page 15, published in Rochester, New York.